US006469099B1

(12) United States Patent
Farah et al.

(10) Patent No.: US 6,469,099 B1
(45) Date of Patent: Oct. 22, 2002

(54) COMPATIBILIZED RESIN BLENDS AND THE PREPARATION THEREOF

(75) Inventors: Hani Farah, Sugarland, TX (US); Francisco Lerma, Jr., Pearland, TX (US)

(73) Assignee: Dow Global Technologies Inc., Midland, MI (US)

( * ) Notice: Subject to any disclaimer, the term of this patent is extended or adjusted under 35 U.S.C. 154(b) by 3 days.

(21) Appl. No.: 09/712,113

(22) Filed: Nov. 14, 2000

(51) Int. Cl.[7] .......................... C08L 75/04; C08L 23/36; C08L 23/26
(52) U.S. Cl. .......................... 525/66; 525/69; 525/125; 525/130; 525/131
(58) Field of Search .......................... 525/131, 66, 69, 525/130

(56) References Cited

U.S. PATENT DOCUMENTS

| | | | |
|---|---|---|---|
| 3,231,619 A | 1/1966 | Speranza et al. ............ 260/584 |
| 4,376,834 A | 3/1983 | Goldwasser et al. ........ 521/159 |
| 4,423,185 A | 12/1983 | Matsumoto et al. ......... 525/130 |
| 4,612,335 A | 9/1986 | Cuscurida et al. ........... 521/167 |
| 4,888,446 A | 12/1989 | Klein et al. .................. 564/478 |
| 5,272,236 A | 12/1993 | Lai et al. .................. 526/348.5 |
| 5,278,272 A | 1/1994 | Lai et al. .................. 526/348.5 |
| 5,364,909 A | * 11/1994 | Guo ............................... 525/69 |
| 5,433,419 A | 7/1995 | Murakami ................... 264/136 |
| 5,627,254 A | 5/1997 | Oriani ........................... 528/76 |
| 5,668,217 A | 9/1997 | Clark ........................... 525/194 |
| 5,959,032 A | 9/1999 | Evans et al. .................... 525/74 |

FOREIGN PATENT DOCUMENTS

| | | | |
|---|---|---|---|
| EP | 347794 A1 | 12/1989 | ........... C08L/75/04 |
| EP | 353673 A1 | 2/1990 | ........... C08L/75/06 |
| EP | 732 349 A2 | 9/1996 | ........... C08G/18/40 |
| EP | 837097 A1 | 4/1998 | ........... C08L/23/00 |
| GB | 1440030 | 6/1976 | ........... C08L/23/02 |
| JP | 3-231963 | 10/1991 | |
| WO | WO 93/02113 | 2/1993 | ............. C08F/8/32 |
| WO | WO 00/63293 | 10/2000 | ........... C08L/75/04 |

OTHER PUBLICATIONS

Macromol. Symp. 112, p 151–158 (1996), Stutz, Chemical Reations During Reactive Blending of Polyurethanes: Fiction or Reality?

* cited by examiner

*Primary Examiner*—Patricia A. Short

(57) ABSTRACT

The present invention is a blend of a polymeric hydrocarbon and a thermoplastic polyurethane which is compatibilized a polymeric hydrocarbon that contains low concentrations of isocyanate reactive group. The compatibilizer can be prepared by reacting a modified polymer having pendant or incorporated amine-reactive groups with a hydroxyl amine, a diamine, or a polyethermonoamine. The compatibilized blend may further include a non-TPU engineering thermoplastic to form compatible blends of the polymeric hydrocarbon and the non-TPU engineering thermoplastic. In this case, the TPU is used as a co-compatibilizer.

9 Claims, No Drawings

COMPATIBILIZED RESIN BLENDS AND THE PREPARATION THEREOF

This invention relates to compatibilized resin blends of normally incompatible polymers and the preparation of such blends.

Compatibilizers for blends of certain polymers are known in the art. For example, U.S. Pat. No. 5,959,032 (Evans et al.) describes the preparation of a compatibilizer (for polypropylene and a thermoplastic polyolefin) which is the reaction product of an anhydride functionalized polypropylene and a polyetheramine.

JP Patent Application No. 3-231963 discloses a blend of a thermoplastic polyurethane and a polyolefin that is compatibilized with a polyolefin modified with carboxyl groups, anhydride groups, and/or epoxy groups. The compatibilized blend is reported to have high heat-resistance, high mechanical strength, and high wear resistance.

The compatiblized blends of the prior art generally suffer from having undesirably low weldline strength, which is important for applications such as automotive instrument panels or bumper beams, the manufacture of which generally requires multiple gate or complex injection molding design. Accordingly, it would be desirable to have available a compatibilizer that addresses this deficiency.

The present invention is a composition comprising a blend or reactive product of a) a thermoplastic polyurethane, and b) a compatibilizer, which is a first polymeric hydrocarbon that contains isocyanate-reactive groups or polyoxyalkylene groups.

In a second aspect, the present invention is a composition comprising a blend or reactive mixture of a) a thermoplastic polyurethane, and b) a compatibilizer, which is a first polymeric hydrocarbon that contains isocyanate reactive groups or polyoxyalkylene groups, and c) a second polymeric hydrocarbon, wherein the first and second polymeric hydrocarbons are each independently selected from the group consisting of polypropylene, high density polyethylene, low density polyethylene, linear low density polyethylene, substantially linear ethylene/αx-olefin copolymers, polystyrene, poly-α-methylstyrene, polyvinyltoluene, and ethylene-styrene interpolymer.

In a third aspect, the present invention is a method of preparing a compatibilizing composition comprising the step of compounding under reactive conditions a) a thermoplastic polyurethane, and b) a compatibilizer, which is a first polymeric hydrocarbon that contains isocyanate reactive groups.

In a first aspect the present invention is a composition comprising a blend or reactive product of a) a thermoplastic polyurethane, and b) a compatibilizer. The compatibilizer, which is a first polymeric hydrocarbon containing either isocyanate reactive groups or polyoxyalkylene groups, is advantageously prepared by contacting under reactive conditions a) a first polymeric hydrocarbon having pendant or incorporated amine-reactive groups with either b) a compound that contains at least one amine group and at least one isocyanate-reactive group; or c) a compound that contains an amine group and polyoxyalkylene group.

As used herein, the term polymeric hydrocarbon refers to a polyolefin, a polymer of an alkenyl aromatic hydrocarbon, or a polymer prepared from olefinic and alkenyl aromatic hydrocarbon monomers. The term isocyanate-reactive group refers to a group that reacts with an isocyanate group, preferably an amino group or hydroxyl group.

Examples of polyolefins include polypropylene, high density polyethylene (HDPE), low density polyethylene (LDPE), linear low density polyethylene (LLDPE), or substantially linear ethylene/α-olefin copolymers such as those copolymers described in U.S. Pat. Nos. 5,272,236 and 5,278,272. Examples of polymers of alkenyl aromatic hydrocarbons include polymers of styrene, α-methylstyrene, and vinyltoluene. An example of a polymer prepared from olefinic and alkenyl aromatic hydrocarbon monomers is ethylene-styrene interpolymer.

Amine-reactive groups can be made pendant to the backbone of the first polymeric hydrocarbon by grafting an ethylenically unsaturated amine-reactive compound onto the backbone of the polymeric hydrocarbon. Alternatively, amine-reactive groups can be incorporated into the backbone of the polymeric hydrocarbon by copolymerization of the olefin or alkenyl aromatic hydrocarbon monomer or both with an ethylenically unsaturated amine-reactive compound. Grafting is a preferred means of incorporating the amine-reactive groups into the polymeric hydrocarbon.

As used herein, the term "ethylenically unsaturated amine-reactive compound" refers to a compound that a) can be attached to the polymeric hydrocarbon by grafting or copolymerization and b) is chemically reactive with an amine. Similarly, the term "amine-reactive group" is used herein to refer to the remnant formed by grafting or copolymerization. Examples of ethylenically unsaturated amine-reactive compounds that can be grafted onto the polymeric hydrocarbon backbone or copolymerized with the olefin or alkenyl aromatic hydrocarbon monomer include ethylenically unsaturated carboxylic acids such as maleic acid, fumaric acid, itaconic acid, acrylic acid, methacrylic acid, and crotonic acid; acid anhydrides such as maleic anhydride and itaconic anhydride; vinyl benzyl halides such as vinyl benzyl chloride and vinyl benzyl bromide; alkyl acrylates and methacrylates such as methyl acrylate, ethyl acrylate, butyl acrylate, lauryl acrylate, methyl methacrylate, ethyl methacrylate, butyl methacrylate, and lauryl methacrylate; and ethylenically unsaturated oxiranes such as glycidyl acrylate, glycidyl methacrylate, and glycidyl ethacrylate. Preferred ethylenically unsaturated amine-reactive compounds include maleic anhydride, acrylic acid, methacrylic acid, glycidyl acrylate, glycidyl methacrylate, with maleic anhydride being more preferred. Polypropylene grafted with maleic anhydride is a more preferred modified polymeric hydrocarbon. An example of a commercially available modified polymeric hydrocarbon is EPOLENE™ PP 3003 wax (a trademark of Eastman Chemical Co), which is a propropylene wax that contains from about 0.5 to 1 weight percent grafted maleic anhydride units.

The degree of incorporation or grafting of the amine-reactive group is application dependent, but is preferably not more than 10 weight percent, more preferably not more than 5 weight percent, more preferably not more than 2 weight percent, and most preferably not more than 1 weight percent; and preferably not less than 0.01 weight percent, more preferably not less than 0.1 weight percent, and most preferably not less than 0.2 weight percent, based on the weight of the compatibilizer.

The hydroxylamine is a compound containing an amine group and at least one hydroxyl group, preferably only one hydroxyl group. The amine can be a primary or a secondary amine, and is preferably a primary amine. The polyamine is a compound that contains at least two amine groups, preferably only two amine groups. An example of a suitable class of hydroxylamines or polyamines is represented by the following formula:

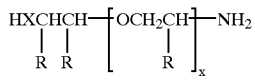

where X is O or NH, where each R is independently H, —CH$_3$, or —CH$_2$CH$_3$; and where x is from 0 to 50. The disclosure and preparation of hydroxyl amines can be found in U.S. Pat. Nos. 3,231,619, 4,612,335, and 4,888,446, which teachings are incorporated herein by reference. Examples of preferred oxyalkanolamines include 2-aminoethanol, 1-amino-2-propanol, 2-amino-1-propanol, 3-amino-1-propanol, 2-(2-aminoethoxy)ethanol, 1-amino-2-butanol, 2-amino-3-butanol, and polyoxyalkylene glycol amines. 2-Aminoethanol is a preferred alkanolamine.

The polyamine is a compound with at least two amine groups. Examples of suitable polyamines include α-ω alkylene diamines such as ethylene diamine, 1,3-propylene diamine, 1,4-butylene diamine, and 1,6-hexylene diamine, as well as polyoxyalkylene diamines, commercially available as JEFFAMINE™ polyoxyalkylene diamines (a trademark of Huntsman Petrochemical). Where the amine-reactive groups pendant to the backbone of the first polymeric hydrocarbon are maleic anhydride groups, the compatibilizer prepared using polyamines or alkanolamines contains pendant groups characterized by the following structure:

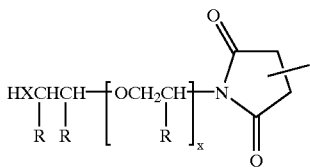

where X is NH or O, each R is independently H, —CH$_3$, or —CH$_2$CH$_3$; and where x is from 0 to 50.

Polyoxyalkylene groups can be incorporated into the backbone of the first polymeric hydrocarbon by reacting the amine-reactive groups with a polyether monoamine such as described by Evans et al. in U.S. Pat. No. 5,959,032, and commercially available as JEFFAMINE™ M-1000 and JEFFAMINE™ 2005 resins (a trademark of Huntsman Chemical). A compatibilizer prepared using polyether monoamines preferably contains pendant groups characterized by the following structure:

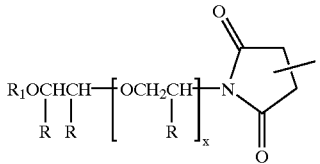

where R$_1$ C$_1$–C$_4$ alkyl, each R is independently H, —CH$_3$, or —CH$_2$CH$_3$; and where x is from 0 to 50.

A stoichiometric excess of the hydroxylamine, polyamine, or polyether monoamine is used so as to ensure complete or substantially complete conversion of the amine-reactive groups.

The thermoplastic polyurethane (TPU) can be an engineering thermoplastic polyurethane or ETPU (also known as a rigid TPU) or a soft TPU. ETPUs have a glass transition temperature (T$_g$) of greater than 50° C. and contain less than 25 weight percent of units of a high molecular weight diol (that is, a diol having a molecular weight of not less than 500 amu). Preferably, the units of the high molecular weight diol constitute not more than 10 weight percent of the ETPU, more preferably not more than 5 weight percent of the ETPU, and more preferably not more than 1 weight percent of the ETPU. A most preferred ETPU contains 0 units of the high molecular weight diol.

Examples of commercially available ETPUs include ISOPLAST™ resins (a trademark of The Dow Chemical Company), the preparation of which is disclosed, for example, by Goldwasser et al. in U.S. Pat. No. 4,376,834 and by Oriani in U.S. Pat. No. 5,627,254, which teachings are incorporated herein by reference. The ETPU contains stuctural units of a chain extender such as 1,6-hexanediol or a blend of 1,4-butanediol and a polyethylene glycol. Preferably the chain extender is a blend of 1,4-butanediol and a polyethylene glycol, more preferably 1,4-butanediol and diethylene glycol or triethylene glycol, and most preferably 1,4-butanediol and triethylene glycol.

The TPU may also be a soft TPU having a T$_g$ of less than 25° C. and a Shore A hardness of not more than 95. An example of a commercially available soft TPU is PELLETHANE™ thermoplastic polyurethane resin. (PELLETHANE is a trademark of The Dow Chemical Company.)

The TPU may be blended or reacted with the compatibilizer. For example, if the compatibilizer contains isocyanate-reactive groups, the blend can be compounded under heat and shear to cause the TPU, particularly the ETPU, to depolymerize to form isocyanate groups and hydroxyl groups. Upon cooling, the isocyanate groups can react with the isocyanate-reactive groups of the compatibilizer to form new urethane linkages. For example, where the compatibilizer is prepared by the reaction of polypropylene grafted with maleic anhydride and 2-aminoethanol or ethylene diamine, the reaction product of the compatibilizer and the ETPU is presumed to have the following structural attribute:

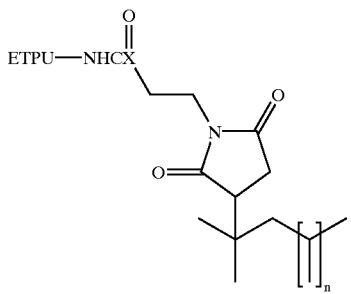

where X is NH or O. Alternatively, if the compatibilizer contains polyoxyalkylene groups that do not react with isocyanate, then the TPU is believed not to react with the compatibilizer.

In a second aspect, the present invention is a composition comprising a blend or reactive mixture of a) the TPU, b) the compatibilizer, and c) a second polymeric hydrocarbon. The composition is preferably either a compatibilized dispersion of the TPU in the second polymeric hydrocarbon matrix, or a dispersion of the second polymeric hydrocarbon in the polyurethane matrix. For a compatibilized dispersion of a TPU in the second polymeric hydrocarbon, the concentration of the TPU, preferably the ETPU is from about 10 to about 40 weight percent, based on the weight of the TPU, the second polymeric hydrocarbon, and the compatibilizer. For a compatibilized dispersion of the second polymeric hydrocarbon in the TPU, preferably the ETPU, the concentration of the second polymeric hydrocarbon in the TPU, is preferably not less than 5 weight percent, and not more than 40, more preferably not more than 30, and most preferably not more than 20 weight percent, based on the weight of the TPU, the second polymeric hydrocarbon, and the compatibilizer.

The amount of compatibilizer used is application dependent, but in general is used at a level sufficient to increase the unnotched izod impact at the weldline or the tensile strength as compared to a second polymeric hydrocarbon and thermoplastic polyurethane blend that contains no compatibilizer. Preferably, the amount of compatibilizer is not less than about 0.5 weight percent, more preferably not less than 1 weight percent, and most preferably not less than 2 weight percent; and preferably not more than 20 weight percent, more preferably not more than 15 weight percent, and most preferably not more than 10 weight percent, based on the total weight of the second polymeric hydrocarbon, the TPU, and the compatibilizer.

The compatibilizer of the present invention can also be used to form a dispersion of the second polymeric hydrocarbon and a broad range of engineering thermoplastics other than TPU (hereinafter, the second engineering thermoplastic), provided the blend contains a co-compatiblizing amount of a TPU. Examples of other engineering thermoplastics include polyesters such as polyethylene terephthalate (PET) and polybutylene terephthalate (PBT), polycarbonates such as Bisphenol-A-polycarbonate, polyamides such as nylons, polyoxymethylenes such as polyacetals, polysulfones, polyarylates, polyarylene oxides such as polyphenylene oxide (PPO), polyvinyl alcohol, polyvinyl acetate, and ethylene-vinyl acetate copolymer, ethylene-vinyl alcohol copolymer, and polyether lactones.

As used herein, a "co-compatibilizing amount" refers to the amount of TPU required to increase the weldline strength or percent elongation of a composition that contains the second polymeric hydrocarbon, the second engineering thermoplastic, and the compatibilizer as compared to a composition that does not contain the TPU. Preferably, the weight-to-weight ratio of the compatibilizer to the TPU is not less than 1:10, more preferably not less than 1:5, and most preferably not less than 1:2; and preferably not greater than 10:1, more preferably not greater than 5:1, and most preferably not greater than 2:1. When TPU is used as a co-compatibilizer, it is preferably used at a level of not less than 0.1 weight percent, more preferably not less than 1 percent, and most preferably not less than 2 weight percent; and preferably not more than 20 weight percent, and more preferably not more than 10 weight percent, based on the weight of the polymeric hydrocarbon, the second engineering thermoplastic, the TPU, and the compatibilizer.

Although the compatibilizer may be reactively extruded with the TPU before contact with the other engineering thermoplastic and the polyolefin, it is not necessary to do so. The compatibilizer, the second engineering thermoplastic, the polymeric hydrocarbon, and the TPU can be conveniently blended together and reactively extruded at depolymerization temperatures, preferably not less than 180° C., and more preferably not less than 200° C.; and preferably not greater than 300° C., and more preferably not greater than 250° C.

The compatibilized blends of the present invention generally exhibit improved properties such as paintability, tensile strength, dart impact and weldline strength as compared to blends that are not compatibilized. These blends are useful in the production of parts for motor vehicles such as bumpers, spoilers, fenders, as well as tools, appliances, sporting goods, and tube connectors.

The following examples are for illustrative purposes only and are not intended to limit the scope of this invention.

EXAMPLE 1

Compatibilization of Polypropylene and a Polyurethane Engineering Thermoplastic Resin A. Preparation of the Compatibilizer A compatibilizer for the polypropylene and polyurethane engineering thermoplastic resin was prepared by tumble blending EPOLENE™ PP 3003 wax (polypropylene grafted with from about 0.5 to about 1 weight percent maleic anhydride) with 2-aminoethanol (1 weight percent) in a plastic bag. The mixture was then extruded through a 34-mm twin screw extruder maintained at 200 rpm and at 220° C. The residence time was about 20 seconds. Conversion of maleic anhydride to the corresponding imide-alkanol was verified by IR spectroscopy.

B. Preparation of the Compatibilized PP-ISOPLAST Mixture

A portion of the compatibilizer as prepared in step A (5 percent by weight) was tumble mixed with HIDMONT™ PD 701 Polypropylene (a trademark of Hidmont, 65 weight percent), and dried XUS 72301.00L engineering thermoplastic polyurethane (30 weight percent), which was prepared substantially as described in U.S. Pat. No. 5,627,254 by reactive extrusion of 4,4'-diisocyanatodiphenylmethane (68 weight percent), triethylene glycol (16.2 weight percent), 1,4-butanediol (14.6 weight %), tris-nonylphenyl phosphite (0.13 weight percent), FOMREZ™ UL-22 catalyst (trademark of Witco Corporation, 0.06 weight percent), ADVAWAX™ 280 (a trademark of Morton Industries, 0.25 weight percent), IRGANOX™ 1010 stabilizer (trademark of Ciba-Geigy, 0.25 weight percent), and UVTEX™ OB 328 stabilizer (a trademark of Ciba Geigy 0.002 weight percent). The mixture was then compounded in the twin screw extruder at 220° C. The resultant blend was dried in a desiccant drier for 4 hours then cut into 6"×0.5"×0.125" (15-cm×1.3-cm×0.3-cm) test specimens and molded at 220° C. The weldline strength (tensile strength from butweldline) was 4200 psi. The elongation to break was found to be 420%.

EXAMPLE 2

Compatibilization of Polyethylene Terephthalate and an Ethylene-Octene Copolymer High Density Polyethylene grafted with about 0.8 to about 1 weight percent maleic anhydride was compounded with 2-aminoethanol (1 weight percent) on the twin screw extruder at 220° C. to form a compatibilizer precursor. A portion of this precursor (5 weight percent), was tumble mixed with TRAYTUF™ 5900 PET (a trademark of Shell Chemical, 70 weight percent), AFFINITY™ 8180 ethylene-octene copolymer (a trademark of The Dow Chemical Company, 20 weight percent), and XUS 72301.00L engineering thermoplastic polyurethane (5 weight percent). The blend was compounded on the twin screw extruder as before. Test specimens were cut and molded as described in Example 1. The unnotched IZOD impact at weldline was found to be 6.5 ft-lb/in.

EXAMPLE 3

Compatibilization of Polyethylene Terephthalate and High Density Polyethylene

The compatibilizer precursor as prepared in Example 2 (5 weight percent) was tumble mixed with TRAYTUF™ 5900 PET (70 weight percent), LUPOLEN™ L426 1AQ 404 high density polyethylene (a trademark of The Dow Chemical Company, 20 weight percent), and XUS 72301.00L engineering thermoplastic polyurethane (5 weight percent). The blend was compounded on the twin screw extruder as before. The unnotched IZOD impact at weldline was found to be 10.8 ft-lb/in.

EXAMPLE 4
Compatibilization of Polypropylene with a Thermoplastic Polyurethane Elastomer A compatibilizer for the polypropylene and a thermoplastic polyurethane elastomer was prepared by tumble blending EPOLENE™ PP 3003 wax with JEFFAMINE™ M-2005 polyether monoamine (a trademark of Huntsman Petrochemical Corp., 1 weight percent) in a plastic bag. The mixture was then extruded through a 34-mm twin screw extruder maintained at 200 rpm and at 220° C. The residence time was about 20 seconds. Conversion of maleic anhydride to the corresponding imide-oxyalkylene was verified by IR spectroscopy. A portion of this compatibilizer was combined with HIDMONT™ PP 701 polypropylene (a trademark of Hidmont Corp., 75 weight percent) and VORANOL™ based TPU XU 63142 (a trademark of The Dow Chemical Company, 20 weight percent). Dart impact at 25° C. was found to be 445 in-lbs. At 15° C., dart impact was 358 in-lbs. At 0° C., dart impact was 338 in-lbs. The tensile strength was 3900 psi.

EXAMPLE 5
Compatibilization of Ethylene-Octene Copolymer with a Thermoplastic Polyurethane A 50:50 weight percent mixture of FUSABOND™ MN-493D resin (a trademark of du Pont de Nemours, 0.5 weight percent grafted ethylene-1-octene copolymer) and AFFINITY™ ethylene-1-octene copolymer (a trademark of The Dow Chemical Company) were compounded and added along with ethylene diamine (0.25% by weight) to a 34-mm twin screw extruder maintained at 200 rpm and 220° C. The residence time was 20 seconds. The ethylene diamine was introduced through as side injection during compounding. Conversion of the maleic anhydride to the corresponding imide was verified by IR spectroscopy. This diluted compatibilizer (4% by weight) was combined with ISOPLAST XUS 72301 engineering thermoplastic polyurethane (88 weight percent) and AFFINITY 8180 ethylene-1-octene copolymer. The unnotched Izod impact value of this composition after molding was 41 ft-lb/in$^2$.

What is claimed is:

1. A composition comprising a blend or reactive product of a) a thermoplastic polyurethane, and b) a compatibilizer, which is a polymeric hydrocarbon that contains pendant groups having the following structure:

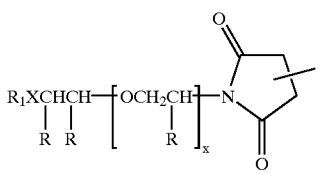

where X is NH or O, each R is independently H, —CH$_3$, or —CH$_2$CH$_3$; R$_1$ is C$_1$–C$_4$ alkyl or H, where x is from 0 to 50, and where the polymeric hydrocarbon is selected from the group consisting of polypropylene, high density polyethylene, low density polyethylene, linear low density polyethylene, and substantially linear ethylene/α-olefin copolymers.

2. The composition of claim 1 wherein R$_1$ is H and the thermoplastic polyurethane is an engineering thermoplastic polyurethane having a T$_g$ of greater than 50° C.

3. The composition of claim 1 wherein R$_1$ is C$_1$–C$_4$ alkyl and the thermoplastic polyurethane is a soft thermoplastic polyurethane having a T$_g$ of less than 25° C.

4. The composition of claim 1 wherein the polymeric hydrocarbon is polypropylene or an ethylene-1-octene copolymer, x is 0, R$_1$ is H, and R is H.

5. The composition of claim 1 wherein the concentration of the pendant groups is not less than 0.1 weight percent, and not more than 2 weight percent, based on the weight of the compatibilizer.

6. A composition comprising a blend or reactive product of a) a thermoplastic polyurethane, and b) a compatibilizer, which is a polymeric hydrocarbon that contains pendant groups having the following structure:

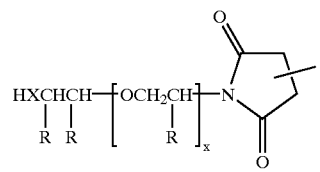

where X is NH or O, each R is independently H, —CH$_3$, or —CH$_2$CH$_3$; and where x is from 0 to 50, and where the concentration of the pendant groups is not less than 0.1 weight percent, and not more than 2 weight percent, based on the weight of the compatibilizer.

7. A method of preparing a compatibilizing composition comprising the step of compounding under reactive conditions a) a thermoplastic polyurethane, and b) a compatibilizer, which is a polymeric hydrocarbon that contains isocyanate reactive groups having the following structure:

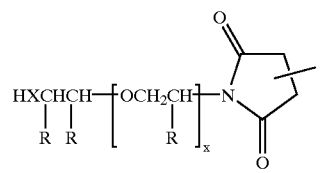

where X is NH or O, each R is independently H, —CH$_3$, or —CH$_2$CH$_3$; and where x is from 0 to 50, wherein the concentration of the pendant groups is not less than 0.1 weight percent, and not more than 2 weight percent, based on the weight of the compatibilizer.

8. The method of claim 7 wherein the compatibilizer is prepared by contacting under reactive conditions a polypropylene grafted with maleic anhydride and an alkanolamine represented by the formula:

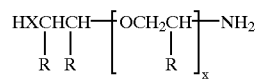

where X is NH or O, each R is independently H, —CH$_3$, or —CH$_2$CH$_3$; and where x is from 0 to 50.

9. The method of claim 8 wherein R=H and x=0.

* * * * *